United States Patent
Inglet et al.

(10) Patent No.: US 7,831,803 B2
(45) Date of Patent: *Nov. 9, 2010

(54) EXECUTING MULTIPLE INSTRUCTIONS MULTIPLE DATE ('MIMD') PROGRAMS ON A SINGLE INSTRUCTION MULTIPLE DATA ('SIMD') MACHINE

(75) Inventors: Todd A. Inglet, Rochester, MN (US); Alan J. King, South Salem, NY (US); Patrick J. McCarthy, Rochester, MN (US); Amanda Peters, Rochester, MN (US); James C. Sexton, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 425 days.

This patent is subject to a terminal disclaimer.

(21) Appl. No.: 11/780,112

(22) Filed: Jul. 19, 2007

(65) Prior Publication Data

US 2009/0024831 A1    Jan. 22, 2009

(51) Int. Cl.
G06F 15/76 (2006.01)
(52) U.S. Cl. ................................. 712/20
(58) Field of Classification Search ............ 712/20
See application file for complete search history.

(56) References Cited

U.S. PATENT DOCUMENTS

| | | | |
|---|---|---|---|
| 4,523,273 A | 6/1985 | Adams et al. | |
| 5,475,856 A | 12/1995 | Kogge | |
| 5,588,152 A | 12/1996 | Dapp et al. | |
| 5,664,214 A | 9/1997 | Taylor et al. | |
| 5,805,915 A * | 9/1998 | Wilkinson et al. | 712/20 |
| 5,828,894 A | 10/1998 | Wilkinson et al. | |
| 6,341,371 B1 * | 1/2002 | Tandri | 717/158 |
| 6,487,651 B1 | 11/2002 | Jackson et al. | |
| 7,373,642 B2 * | 5/2008 | Williams et al. | 717/160 |
| 7,383,470 B2 * | 6/2008 | Canning et al. | 714/38 |
| 2002/0038453 A1 * | 3/2002 | Riddle et al. | 717/151 |
| 2002/0133688 A1 | 9/2002 | Lee et al. | |
| 2003/0097652 A1 * | 5/2003 | Roediger et al. | 717/160 |
| 2005/0240896 A1 * | 10/2005 | Wu et al. | 717/100 |
| 2008/0046685 A1 | 2/2008 | Pechanek et al. | |

(Continued)

OTHER PUBLICATIONS

Siegel et al, PASM: A partitionable SIMD/MIMD system for image processing and pattern recognition, IEEE Transactions on Computers, vol. c-30, No. 12, Dec. 1981, p. 934-947.

(Continued)

*Primary Examiner*—Jacob Petranek
(74) *Attorney, Agent, or Firm*—Biggers & Ohanian, LLP; James R. Nock

(57) ABSTRACT

Executing MIMD programs on a SIMD machine, including establishing on the SIMD machine a plurality of SIMD partitions; booting a first SIMD partition in MIMD mode; executing, on a compute node of the first SIMD partition booted in MIMD mode, a MIMD accelerator program; executing a SIMD program in a second SIMD partition, one instance of the SIMD program executing on each compute node of the second SIMD partition, each instance of the SIMD program carrying out a portion of the data processing effected by the SIMD program; and accelerating, by an instance of the SIMD program through the MIMD accelerator program, a portion of the data processing of the instance of the SIMD program.

3 Claims, 9 Drawing Sheets

U.S. PATENT DOCUMENTS

2008/0288746 A1* 11/2008 Inglett et al. .................. 712/20
2008/0288747 A1* 11/2008 Inglett et al. .................. 712/20
2009/0049275 A1    2/2009  Kyo

OTHER PUBLICATIONS

Office Action Dated Mar. 11, 2009 in U.S. Appl. No. 11/749,397.
Office Action Dated Apr. 9, 2009 U.S. Appl. No. 11/750,497.

* cited by examiner

EXECUTING MULTIPLE INSTRUCTIONS MULTIPLE DATE ('MIMD') PROGRAMS ON A SINGLE INSTRUCTION MULTIPLE DATA ('SIMD') MACHINE

BACKGROUND OF THE INVENTION

1. Field of the Invention

The field of the invention is data processing, or, more specifically, methods, apparatus, and products for executing Multiple Instructions Multiple Data ('MIMD') programs on a Single Instruction Multiple Data ('SIMD') machine.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination. Parallel computing may be implemented in architectures optimized to execute in a mode of 'Single Instruction, Multiple Data' ('SIMD') or in a mode of 'Multiple Instruction, Multiple Data' ('MIMD'). This exact terminology, SIMD and MIMD, is from the well-known Flynn's taxonomy, a classification of computer architectures first described by Michael J. Flynn in 1966.

A MIMD machine is a computer in which multiple autonomous processors simultaneously execute different instructions on different data. Distributed systems are generally recognized to be MIMD architectures—either exploiting a single shared memory space or a distributed memory space. Many common computer applications are implemented with MIMD architectures, including, for example, most accounting programs, word processors, spreadsheets, database managers, browsers, web applications, other data communications programs, and so on.

A SIMD machine is a computer that exploits multiple data streams against a single instruction stream to perform operations which may be naturally parallelized. SIMD machines are ubiquitous on a small scale, in digital speech processors, graphics processors, and the like. In addition, however, SIMD machines also make up the largest, most powerful computers in the world. The BlueGene/L computer architecture, for example, is implemented with a SIMD architecture. BlueGene/L installations represent nine of the twenty-five most powerful computer installations in the world—according to a current listing of the top 500 supercomputer sites published by the TOP500 Project. In fact, most, if not all, of the most powerful computers in the world today are SIMD machines.

SIMD machines execute parallel algorithms, typically including collective operations. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A SIMD machine is composed of compute nodes and other processing nodes as well, including, for example, input/output ('i/o') nodes, and service nodes.

Parallel algorithms are designed also to optimize the data communications requirements among the nodes of a SIMD machine. There are two ways parallel processors communicate, shared memory or message passing. Shared memory processing needs additional locking technology for the data and imposes the overhead of additional processor and bus cycles and also serializes some portion of the algorithm. Message passing processing uses high-speed data communications networks and message buffers, but this communication adds transfer overhead on the data communications networks as well as additional memory need for message buffers and latency in the data communications among nodes. Designs of SIMD machines use specially designed data communications links so that the communication overhead will be small but it is the parallel algorithm that decides the volume of the traffic.

The large aggregation of data processing power represented by massively parallel SIMD machines is extremely attractive to MIMD applications. The BlueGene/L architecture produces many teraflops per rack, has a large memory footprint, and low power consumption—all features which would make it very useful if MIMD programs could be run on it. MIMD operations, however, require a model that allows for independent programs on each compute. Today the hardware and software for such SIMD machines are designed only to support applications based on cooperating nodes, purely parallel SIMD applications. Specialized memory sharing and data communications technology in SIMD machines, which make the SIMD machines so powerful, render such SIMD machines useless for MIMD applications. In the BlueGene example, a processing error on one node of a partition immediately terminates all data processing operations on every compute node in the partition—a necessary requirement when all the compute nodes are running the same SIMD application—but a disaster for MIMD operations.

SUMMARY OF THE INVENTION

Methods, apparatus, and computer program products are disclosed for executing MIMD programs on a SIMD machine, the SIMD machine including a plurality of compute nodes, each compute node capable of executing only a single thread of execution, the compute nodes initially configured exclusively for SIMD operations, the SIMD machine also including a data communications network, the network further including synchronous data communications links among the compute nodes, including establishing on the SIMD machine a plurality of SIMD partitions, each SIMD partition comprising a plurality of the compute nodes, the compute nodes in each SIMD partition electronically isolated from compute nodes in other partitions of the SIMD machine and coupled to one another through links of the network for synchronous data communications for parallel SIMD operations among the compute nodes in each SIMD partition; booting a first SIMD partition in MIMD mode; executing, on a compute node of the first SIMD partition booted in MIMD mode, a MIMD accelerator program; executing a SIMD program in a second SIMD partition, one instance of the SIMD program executing on each compute node of the second SIMD partition, each instance of the SIMD program carrying out a portion of the data processing effected by the SIMD program; and accelerating, by an instance of the SIMD program through the MIMD accelerator program, a portion of the data processing of the instance of the SIMD program.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
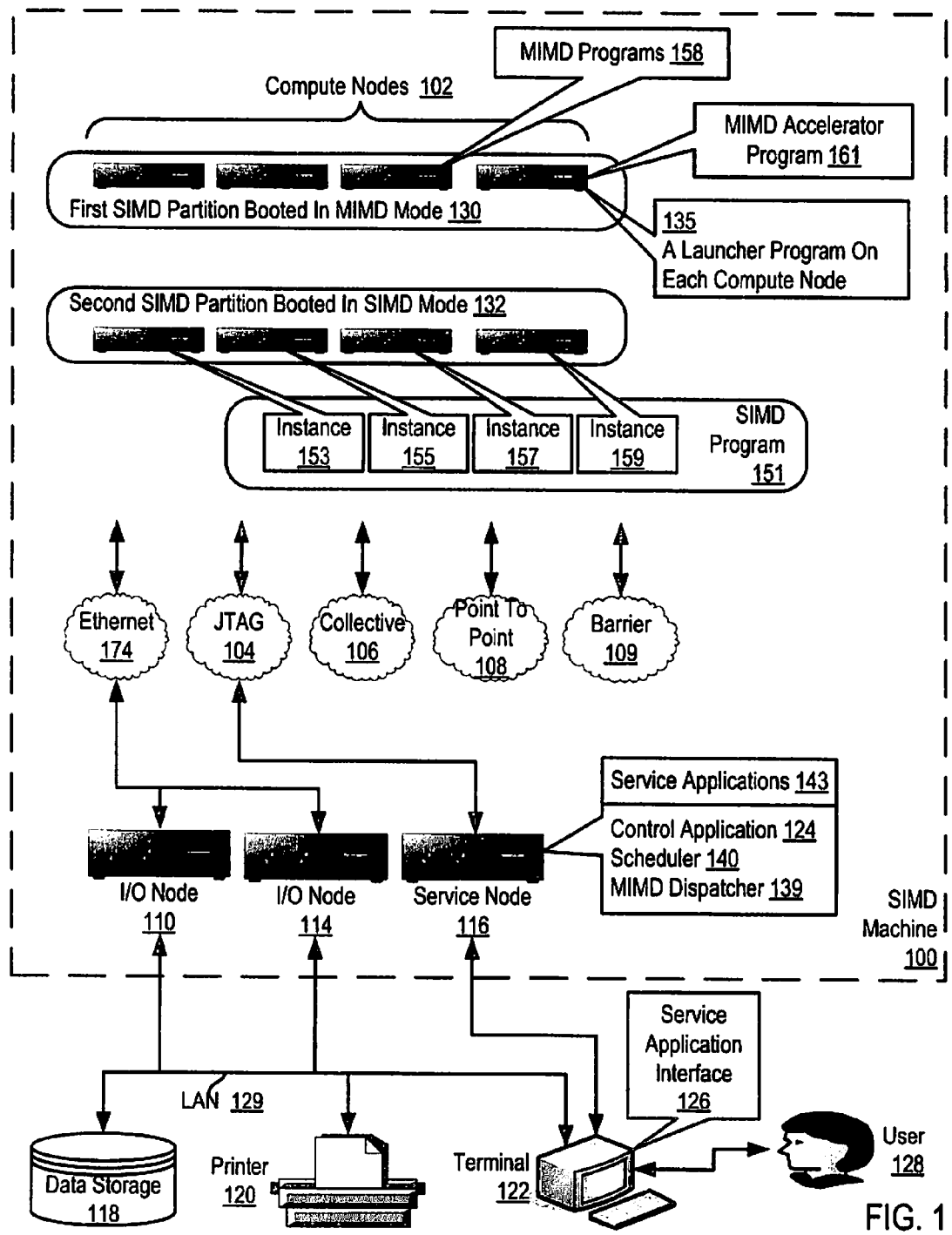
FIG. 1 illustrates an exemplary system for executing MIMD programs on a SIMD machine according to embodiments of the present invention.

Exemplary methods, apparatus, and computer program products for executing Multiple Instructions Multiple Data ('MIMD') programs on a Single Instruction Multiple Data ('SIMD') machine according to embodiments of the present invention are described with reference to the accompanying drawings, beginning with FIG. 1. FIG. 1 illustrates an exemplary system for executing MIMD programs on a SIMD machine according to embodiments of the present invention. The system of FIG. 1 includes a SIMD machine (100), a computer configured initially for exclusively parallel, collective operations. The system of FIG. 1 also includes non-volatile memory for the SIMD machine in the form of data storage device (118), an output device for the SIMD machine in the form of printer (120), and an input/output ('i/o') device for the SIMD machine in the form of computer terminal (122). The SIMD machine (100) in the example of FIG. 1 includes a plurality of compute nodes (102), each of which is capable of executing only a singe thread of execution.

The compute nodes (102) are coupled for data communications by several independent data communications networks including:
 a high speed Ethernet network (174) that connects peripherals through i/o node to compute nodes,
 a Joint Test Action Group ('JTAG') network (104) for out of band signaling between service nodes, i/o nodes, and compute nodes,
 a synchronous collective network (106) in which each compute node connects in a tree structure to three neighboring compute nodes, with the collective network optimized for massively parallel collective operations among compute nodes,
 a synchronous point-to-point network (108), optimized for point to point operations among compute nodes, in which each compute node connects in a torus to six neighboring compute nodes through which each node in the torus can communicate directly or indirectly with every other compute node in the torus, and
 a barrier network (109) connecting all compute nodes in an independent network in which each compute node can signal to all other compute nodes processing arrival at a parallel processing barrier, halting further processing until all nodes have reported arrival at the barrier.

Each data communications network is implemented with data communications links among the compute nodes (102). The data communications links provide data communications for parallel operations among the compute nodes of the SIMD machine. Point-to-point network (108) is a synchronous data communications network that includes synchronous data communications links connected among the compute nodes so as to organize the compute nodes in a mesh or torus. Collective network (106) is a synchronous data communications network that includes synchronous data communications links connected among the compute nodes so as to organize the compute nodes in a tree structure.

The compute nodes (102) may be organized in SIMD partitions (130 132). A SIMD partition is an operational group of compute nodes for collective parallel operations on a SIMD machine (100). A SIMD partition is a set of compute nodes upon which parallel collective operations of a SIMD application execute. Such a SIMD partition may include all the compute nodes in a SIMD machine (100) or a subset all the compute nodes. The compute nodes in a SIMD partition are electronically isolated from compute nodes in other partitions of the SIMD machine. The compute nodes in a SIMD partition are coupled to one another through links of at least one network for synchronous data communications for parallel SIMD operations among the compute nodes in the SIMD partition. In the example of FIG. 1, several networks connect the compute nodes.

Collective operations are implemented with data communications among the compute nodes of a SIMD partition. Collective operations are those functions that involve all the compute nodes of an operational group in parallel operations. A collective operation is an operation, a message-passing computer program instruction that is executed synchronously, that is, at approximately the same time, by all the compute nodes in a SIMD partition. Such synchronous operations are supported by synchronous data communications networks and parallel processing barriers. Parallel collective operations can be implemented with point to point operations.

A collective operation requires that all processes on all compute nodes within a SIMD partition call the same collective operation with matching arguments. A 'broadcast' is an example of a collective operations for moving data among compute nodes of a SIMD partition. A 'reduce' operation is an example of a collective operation that executes arithmetic or logical functions on data distributed among the compute nodes of a SIMD partition. A SIMD partition may be implemented as, for example, an MPI 'communicator.'

'MPI' refers to 'Message Passing Interface,' a parallel communications library, a module of computer program instructions for data communications on parallel computers. Examples of parallel communications libraries that may be useful or may be improved to be useful for executing MIMD programs on a SIMD machine according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given SIMD partition. The send buffer will be divided equally and dispersed to all processes (including itself). Each compute node in the SIMD partition is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the SIMD machine (100) in this example includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/0 devices (118, 120, 122) through local area network ('LAN') (130).

The SIMD machine (100) also includes a service node (116) coupled to the compute nodes through one of the networks (104). Service node (116) provides services common to pluralities of compute nodes, loading programs into the compute nodes, starting program execution on the compute nodes, retrieving results of program operations on the computer nodes, and so on. Service node (116) runs service applications (143) and communicates with users (128) through a service application interface (126) that runs on computer terminal (122). Service applications (143) that execute on the service node (116) include:

- a control application (124), which is a module of computer program instructions that boots partitions, loads launcher programs onto compute nodes in SIMD partitions booted in MIMD mode, and administers error conditions detected on compute nodes,
- a scheduler (140), which is a module of computer program instructions that schedules data processing jobs on the SIMD machine, including installing SIMD programs on compute nodes and passing MIMD jobs along to a MIMD dispatcher for installation on SIMD partitions booted in MIMD mode; and
- a MIMD dispatcher (139), which is a module of computer program instructions that installs MIMD programs on compute nodes in SIMD partitions booted in MIMD mode.

In the example of FIG. 1, all the compute nodes (102) are initially configured exclusively for SIMD operations, and the system of FIG. 1 operates generally to execute MIMD programs (158) on a SIMD machine (100) according to embodiments of the present invention by establishing on the SIMD machine a plurality of SIMD partitions (130, 132); booting a first SIMD partition (130) in MIMD mode; executing, on a compute node (102) of the first SIMD partition (130) booted in MIMD mode, a MIMD accelerator program (161); executing a SIMD program (151) in a second SIMD partition (132), one instance (153, 155, 157, 159) of the SIMD program (151) executing on each compute node (102) of the second SIMD partition (132), each instance of the SIMD program carrying out a portion of the data processing effected by the SIMD program; and accelerating, by an instance of the SIMD program through the MIMD accelerator program, a portion of the data processing of the instance of the SIMD program.

Booting a SIMD partition (130) in MIMD mode provides the capability of executing, not only a MIMD accelerator program, but also executing by launcher programs (135) multiple additional MIMD programs (158) as well on any or all of the compute nodes in a SIMD partition booted in MIMD mode. MIMD accelerator programs in fact represent an additional category of MIMD programs. Each MIMD program (158) is a module of computer program instructions that autonomously executes different instructions on different data. That is, each MIMD program has computer program instructions that typically are not the same instructions executed by other MIMD programs, and each MIMD program operates on data that typically is not the same data processed by other MIMD programs. Booting a SIMD partitions (130) in MIMD mode may be carried out by setting, in operating systems on the compute nodes of a SIMD partition, flags indicating MIMD operation; loading onto the compute nodes of the SIMD partition a launcher program (135); initializing with link training synchronous data communications among links of the network among compute nodes in the SIMD partition; initializing, with a parallel processing barrier, parallel operations among the compute nodes of the SIMD partition; and executing a launcher program (135) on each compute node in the SIMD partition.

A MIMD accelerator program is a MIMD program is a MIMD program that is capable of performing some portion of the data processing of a SIMD program faster than the SIMD program could do it without the accelerator program. An 'accelerator' generally is some combination of computer hardware and software that performs some function faster than is possible in software running on a normal, general purpose processor. Examples of prior art accelerators include floating point units ('FPUs'), digital signal processors ('DSPs'), and graphics processing units ('GPUs'). Prior art accelerators, DSPs and GPUs, for example, typically were SIMD accelerators that received requests for acceleration from general purpose CPUs which frequently in prior art were MIMD devices. That is, the typical pattern in prior art was that MIMD programs requested acceleration from SIMD programs. In systems that execute MIMD programs on a SIMD machine according to embodiments of the present invention, however, it is a SIMD program that uses a MIMD program for acceleration.

In systems that execute MIMD programs on a SIMD machine according to embodiments of the present invention there is no one-to-one relationship between SIMD nodes and accelerators. Such a one-to-one relationship was common in the prior art: a general purpose CPU typically would have a single FPU, a single GPU, or a single DSP. In systems that execute MIMD programs on a SIMD machine according to embodiments of the present invention, however, one instance of a SIMD program may use multiple accelerator programs executing simultaneously on multiple compute nodes of a SIMD partition booted in MIMD mode. In addition, one accelerator program may provide services to more than one instance of a SIMD program. And in at least some applications, only a minority of the instances of a SIMD program may need acceleration, such as, for example, in sparse matrix multiplication where one instance of a SIMD program finds itself burdened with many more calculations than would be typical for nodes generally in such an application.

A launcher program (135) is a module of computer program instructions that runs on a compute node in a SIMD partition booted in MIMD mode, receives from a MIMD dispatcher a name of a MIMD program, and executes the MIMD program on the compute node. A launcher program may be implemented, for example, as illustrated by these computer program instructions:

```
launcher(dispatcherNetworkAddress)
{
    socketID = socket( );
    connect(socketID, dispatcherNetworkAddress);
    read(socketID, MIMDProgramName);
    close(socketID);
    exec(MIMDProgramName);
}
```

This example launcher program is 'pseudocode,' an explanation set forth in code form, not an actual working model. As shown in this pseudocode example, the launcher programs typically use a Unix-like exec( ) function to execute MIMD programs, so that executing a MIMD program replaces the launcher program with the MIMD program in process address space in computer memory of the compute node. Each compute node operates single-threaded, with only one thread of execution on the node. When a launcher program executes a MIMD program, the MIMD program, as a new thread of execution on a compute node that only supports one thread of execution, is written over the launcher program in the compute node's process address space, wiping out the launcher program. The operating system on the compute node, therefore, notes its set MIMD flag and re-executes a launcher program on the compute node in the SIMD partition upon termination of the MIMD program earlier executed by a launcher program.

The arrangement of nodes, networks, and I/O devices making up the exemplary system illustrated in FIG. 1 are for explanation only, not for limitation of the present invention. Data processing systems capable of executing MIMD programs on a SIMD machine according to embodiments of the present invention may include additional nodes, networks, devices, and architectures, not shown in FIG. 1, as will occur to those of skill in the art. The SIMD machine (100) in the example of FIG. 1 includes sixteen compute nodes (102)—whereas SIMD machines capable of executing MIMD programs according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Executing MIMD programs on a SIMD machine according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful for executing MIMD programs on a SIMD machine according to embodiments of the present invention. The compute node (152) of FIG. 2 includes at least one computer processor (164) as well as random access memory ('RAM') (156). Processor (164) is connected to RAM (156) through a high-speed memory bus (154) and to other components of the compute node through a bus adapter (194) and an extension bus (168).

Stored in RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in executing MIMD programs on a SIMD machine according to embodiments of the present invention, using a traditional programming language such as the C programming language, and using traditional programming methods to write parallel communications routines that send and receive data among nodes on two independent data communications networks. Alternatively, existing prior art libraries may be used. Examples of parallel communications libraries that may be used or improved for use in executing MIMD programs on a SIMD machine according to embodiments of the present invention include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a SIMD machine to run a single thread of execution with no user login and no security issues because the thread is entitled to complete access to all resources of the node. The quantity and complexity of tasks to be performed by an operating system on a compute node in a SIMD machine therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular SIMD machine. Operating systems that may usefully be improved, simplified, for use in a compute node for executing MIMD programs on a SIMD machine include UNIX™, Linux™, Microsoft XP™, AIX™, IBM's i5/OS™, and others as will occur to those of skill in the art.

Also stored in RAM (156) are a MIMD program (158), a MIMD accelerator program (161), and an instance of a SIMD program (153), shown together for ease of explanation, although all three would not typically be present in the same compute node at the same time. The instance of a SIMD program (153) would execute on a compute node in a SIMD partition (132 on FIG. 1) booted in SIMD mode, and the MIMD program (158) and the MIMD accelerator program (161) would execute on compute nodes in a SIMD partition (130 on FIG. 1) booted in MIMD mode.

Also stored in RAM is a launcher program (135), a module of computer program instructions that runs on the compute node (152) in a SIMD partition booted in MIMD mode, receives from a MIMD dispatcher a name of a MIMD program (158), and executes the MIMD program (158) on the compute node (152). The launcher program (135) in this example is shown disposed in the RAM space of the operating system (162), presumably having executed the MIMD program (158) or the MIMD accelerator program (161), which are shown here disposed in process address space (134), having wiped the launcher program out of the process address space (134) when the launcher program executed a MIMD program or a MIMD accelerator program.

Also stored in RAM (156) is a MIMD flag (136), a Boolean data element which when set to TRUE advises the operating system that the compute node is running in MIMD mode, so that upon termination of the MIMD program, the operating system, rather than terminating its own operations as it would do if it were operating in purely SIMD mode, now re-executes the launcher program (135). And the compute node operates generally as follows:

the launcher program connects to a dispatcher (139 on FIGS. 1 and 7),
the launcher programs receives from the dispatcher a MIMD program name—or the name of a MIMD accelerator program,
the launcher program executes the MIMD program or the MIMD accelerator program when provided with the program name, installing the MIMD program or the MIMD accelerator program in process address space in RAM and wiping out the launcher program,
the operating system re-executes the launcher program upon termination of the MIMD program,
and so on, repeating indefinitely.

The MIMD flag advises the operating system to reload the launcher program when the MIMD program exits—without notifying the control application (124 on FIG. 1) of the exit. In effect, compared to SIMD operations, the MIMD mode compute node never exits. It just reloads the launcher program and waits for another MIMD program name or MIMD accelerator program name to execute.

Also stored in RAM (156) is a reboot flag (137), a Boolean data element which when set to TRUE advises the operating system (162) that a current boot of the operating system is a reboot, that is, that the compute node has already been booted at least once before as part of a SIMD partition booted in MIMD mode. Remember that the overall undertaking here is executing a MIMD program on a SIMD machine where, in fact, the SIMD machine remains a SIMD machine. In its inception, therefore, a boot of a SIMD partition in MIMD mode is still a boot of a SIMD partition. The boot process is modified by inclusion of a launcher program, a MIMD flag, a reboot flag, and so on, but the underlying process is a SIMD boot. The original boot, therefore, includes SIMD-type functions that are not needed on a reboot. Examples of such SIMD-type functions include initializing with link training synchronous data communications among links of the network among compute nodes in the SIMD partition and initializing, with a parallel processing barrier, parallel operations among the compute nodes of the SIMD partition. Such SIMD-type functions are not needed on a reboot because, for example, the data communications links are already trained for synchronous operation, and there is no need to initialize parallel processing with a parallel processing barrier because, at the time of a reboot, there is no longer any parallel processing in the SIMD partition booted in MIMD mode. The operating system (162), advised to do so by a reboot flag (137) set to TRUE, upon a reboot, omits from the boot process the initializing of synchronous data communications on the network with link training and the initializing of parallel operations among the compute nodes with a parallel processing barrier.

Figure 2:
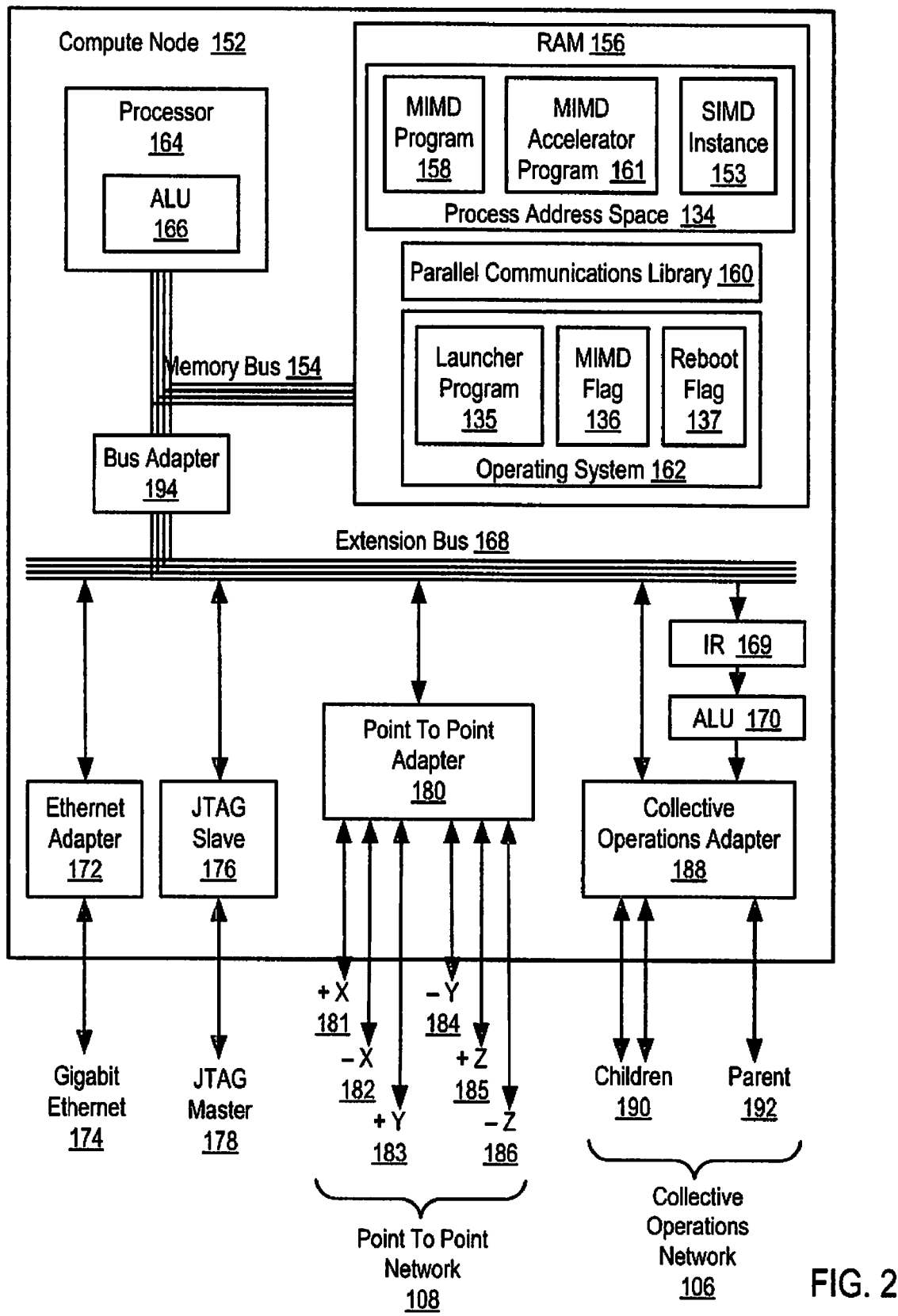
FIG. 2 sets forth a block diagram of an exemplary compute node useful in executing MIMD programs on a SIMD machine according to embodiments of the present invention.

The exemplary compute node (152) of FIG. 2 includes several communications adapters (172, 176, 180, 188) for implementing data communications with other nodes of a SIMD machine. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that execute MIMD programs on a SIMD machine according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in executing MIMD programs on a SIMD machine according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use of dedicated ALU (170).

Figure 3A:
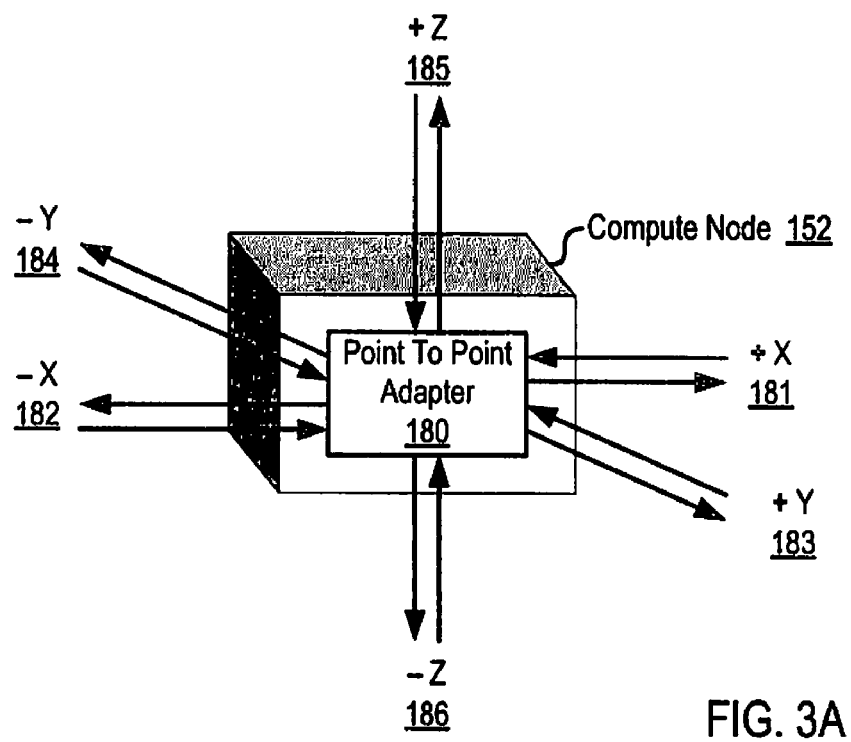
FIG. 3A illustrates an exemplary Point To Point Adapter useful in systems that execute MIMD programs on a SIMD machine according to embodiments of the present invention.

For further explanation, FIG. 3A illustrates an exemplary Point To Point Adapter (180) useful in systems that execute MIMD programs on a SIMD machine according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
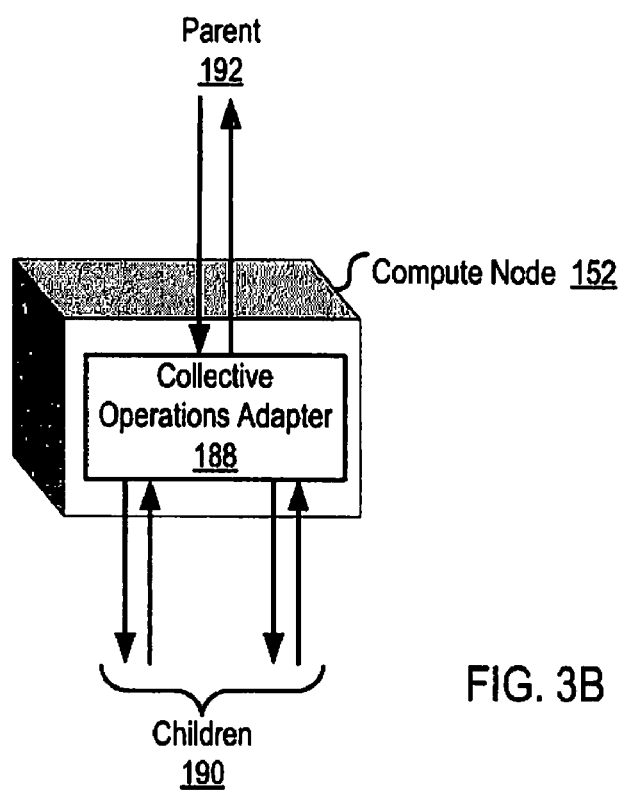
FIG. 3B illustrates an exemplary Collective Operations Adapter useful in systems that execute MIMD programs on a SIMD machine according to embodiments of the present invention.

For further explanation, FIG. 3B illustrates an exemplary Collective Operations Adapter (188) useful in systems that execute MIMD programs on a SIMD machine according to embodiments of the present invention. Collective Operations Adapter (188) is designed for use in a network optimized for collective operations, a network that organizes compute nodes of a SIMD machine in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
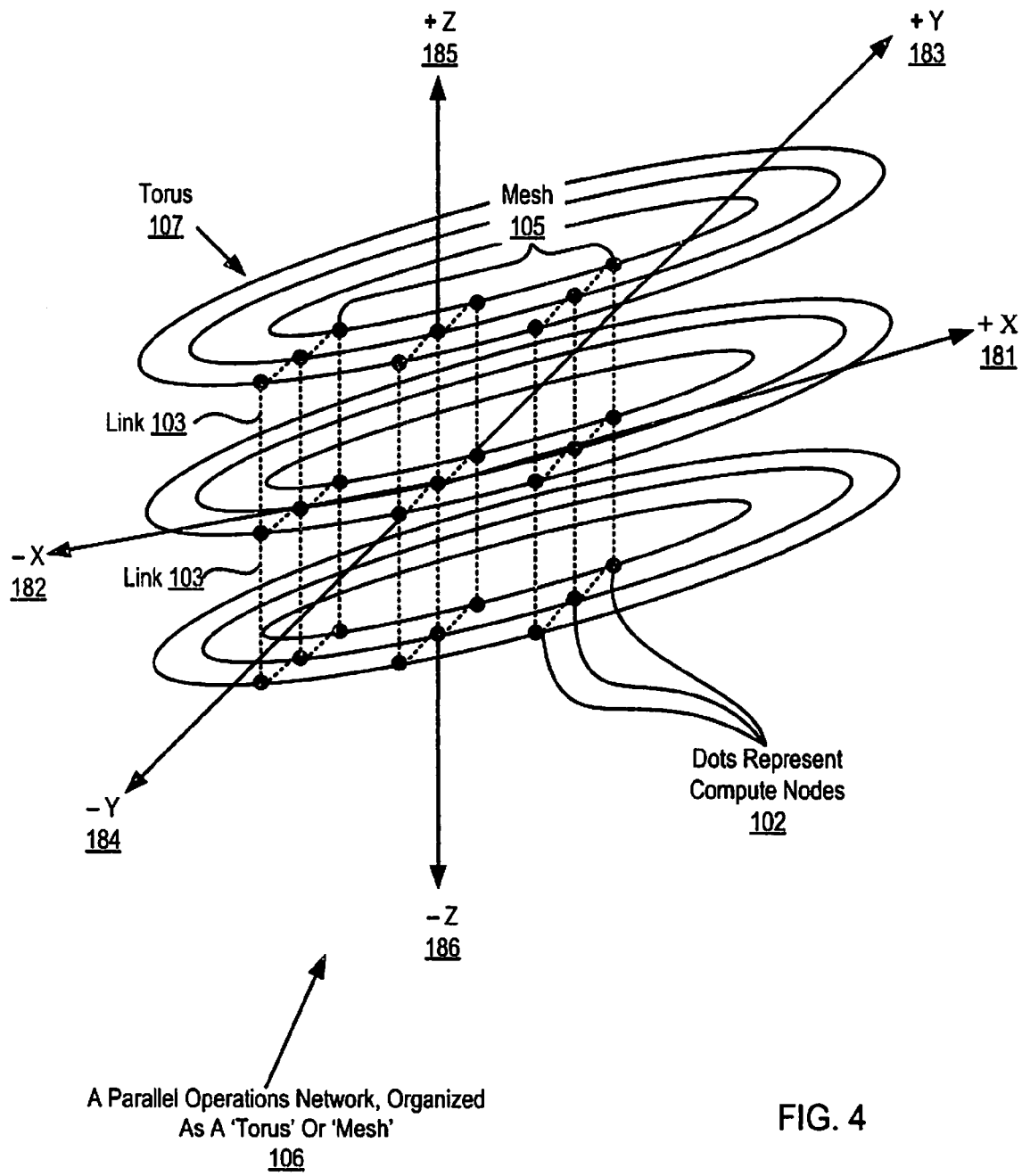
FIG. 4 illustrates an exemplary data communications network optimized for point to point operations, useful in systems that executing MIMD programs on a SIMD machine.
Figure 5:
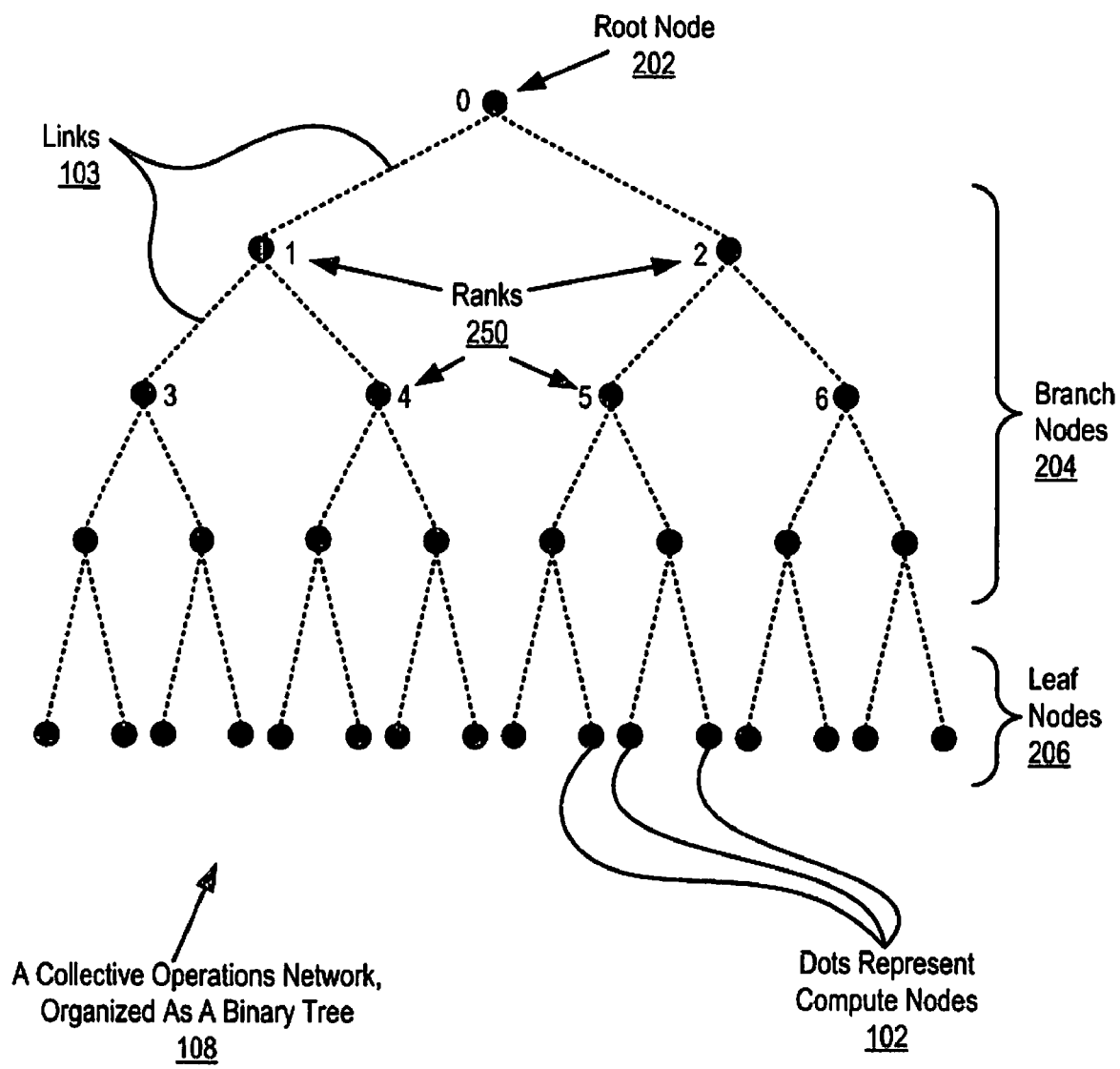
FIG. 5 illustrates an exemplary data communications network optimized for collective operations, useful in systems that executing MIMD programs on a SIMD machine.

For further explanation, FIG. 4 illustrates an exemplary data communications network optimized for point to point operations (106). In the example of FIG. 4, dots represent compute nodes (102) of a SIMD machine, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in executing MIMD programs on a SIMD machine in accordance with embodiments of the present invention may contain only a few compute nodes or may contain thousands of compute nodes. For further explanation, FIG. 5 illustrates an exemplary data communications network (108) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a SIMD machine, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (108). For clarity of explanation, the data communications network of FIG. 5 is illustrated with only 31 compute nodes, but readers will recognize that a data communications network optimized for collective operations for use in executing MIMD programs on a SIMD machine in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
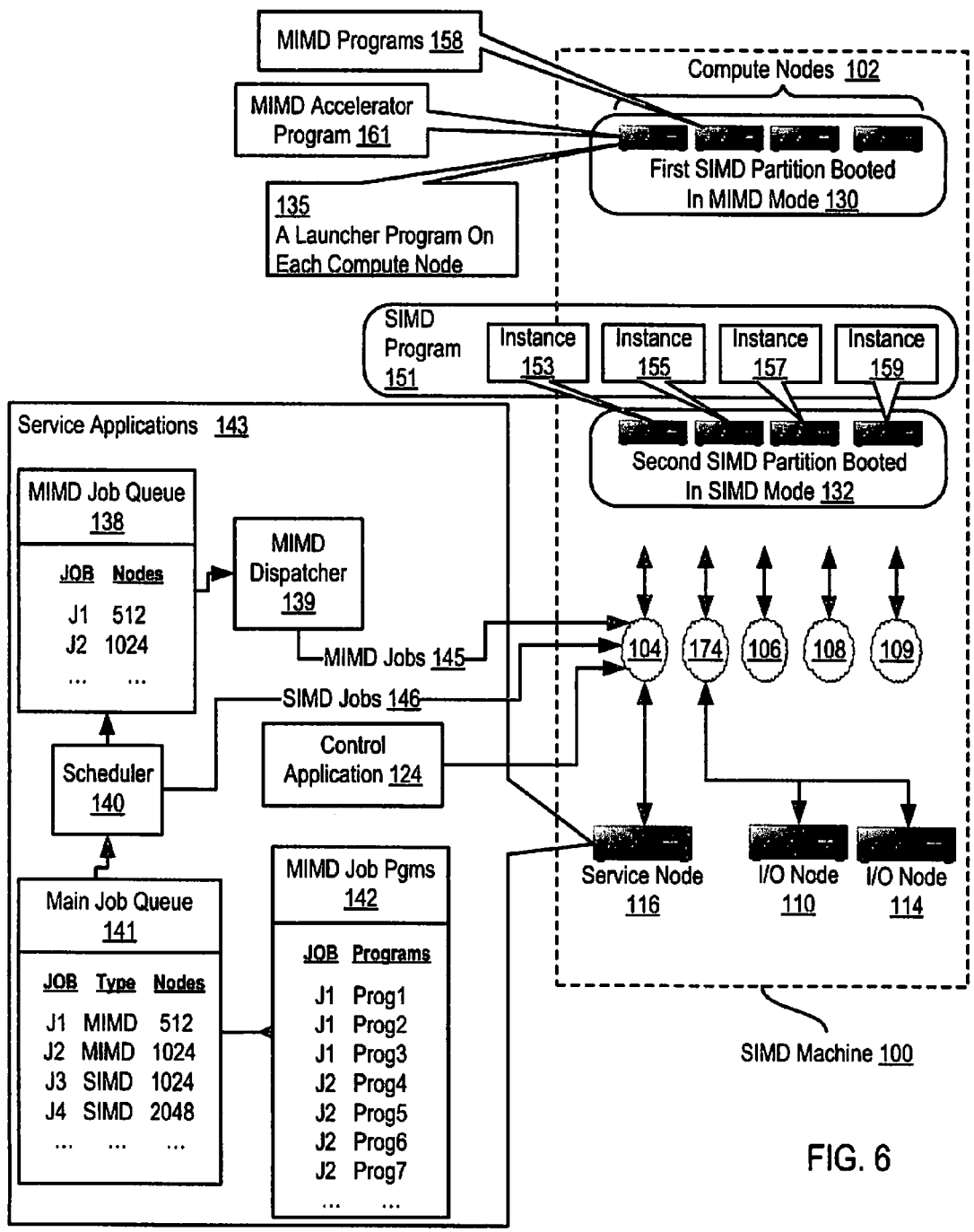
FIG. 6 sets forth a functional block diagram illustrating a further exemplary system for executing MIMD programs on a SIMD machine according to embodiments of the present invention.

For further explanation, FIG. 6 sets forth a functional block diagram of an exemplary SIMD machine useful for executing MIMD programs on a SIMD machine according to embodiments of the present invention. The SIMD machine (100) includes compute nodes (102) that are coupled for data communications by several independent data communications networks including a high speed Ethernet network (174), a Joint Test Action Group ('JTAG') network (104), a collective network (106) which is optimized for collective operations, a point-to-point network (108) which is optimized for point to point operations among compute nodes, and a barrier network (109) which is optimized for execution of parallel processing barriers. Each data communications network is implemented with data communications links among the compute nodes (102). The data communications links provide data communications for parallel operations among the compute nodes of the SIMD partition. Point-to-point network (108) is a synchronous data communications network that includes synchronous data communications links connected among the compute nodes so as to organize the compute nodes of the SIMD partition in a mesh or torus. Collective network (106) is a synchronous data communications network that includes synchronous data communications links connected among the compute nodes so as to organize the compute nodes of the SIMD partition in a tree structure. The point-to-point network (108) and the collective network (106), as well as the other networks in the example of FIG. 1, are characterized by a network topology (161).

The SIMD machine (100) includes a service node (116) coupled to the compute nodes through the JTAG network (104). Service node (116) provides services common to pluralities of compute nodes, loading programs into the compute nodes, starting program execution on the compute nodes, retrieving results of program operations on the computer nodes, and so on. Service node (116) runs service applications (143) and communicates with users (128) through a service application interface (126) that runs on computer terminal (122). Service applications (143) that execute on the service node (116) include:

a control application (124), which is a module of computer program instructions that boots partitions, loads launcher programs onto compute nodes in SIMD partitions booted in MIMD mode, and administers error conditions detected on compute nodes, a scheduler (140), which is a module of computer program instructions that schedules data processing jobs on the SIMD machine, including installing SIMD programs on compute nodes and passing MIMD jobs along to a MIMD dispatcher for execution in SIMD partitions booted in MIMD mode; and a MIMD dispatcher (139), which is a module of computer program instructions that installs MIMD programs, including MIMD accelerator programs, on compute nodes in SIMD partitions booted MIMD mode.

The service applications in this example are supported by a main job queue (141), a MIMD job programs table (142), and a MIMD job queue (138). The main job queue (141) is represented in this example as a table with columns for a job identification code, a job type code, and a column specifying the number of compute nodes needed to execute a job. Each record in the main job queue (141) represents either a MIMD job or a SIMD job. Each SIMD job represents a single SIMD program that will run identically on each compute node (102) in a SIMD partition booted in SIMD mode. Each MIMD job represents one or more MIMD programs that will be executed on one or more compute nodes of a SIMD partition booted in MIMD mode.

The main job queue (141) in this example is represented in a one-to-many data modeling relationship with the MIMD job programs table (142) using the job identification code as a foreign key. Each SIMD job is implemented with a single SIMD program, but a MIMD job, requiring no strict parallelism, no collective operations, no parallel processing barriers, can be composed of any number of individual MIMD programs which may be executed asynchronously with respect to one another. So in this example, the MIMD job identified by job code "J1" is composed of three MIMD programs, "Prog1," "Prog2," and "Prog3." Similarly, the MIMD job identified by job code "J2" is composed of four MIMD programs, "Prog4," "Prog5," "Prog6," and "Prog7."

The scheduler (140) only loads and executes SIMD jobs (146). The scheduler is optimized to load the same SIMD program onto each and every compute node of the SIMD machine, but loading a MIMD job requires loading multiple separate, individual programs onto separate compute nodes, a process for which the MIMD dispatcher is optimized. When the scheduler (140) encounters a MIMD job in the main job queue (141), therefore, the scheduler hands that job off to the MIMD dispatcher (139), which then loads and executes the MIMD job (145). The scheduler (140) hands off MIMD jobs to the MIMD dispatcher (130) by registering the jobs in the MIMD job queue (138), represented here as a table with two columns, a job identification and a representation of the number of compute nodes needed for each MIMD job, where each record in the MIMD job queue represents a MIMD job to be dispatched for execution by the MIMD dispatcher (139). The MIMD dispatcher (139) dispatches MIMD jobs for execution by communicating the name of MIMD programs comprising a MIMD job to individual launcher programs running on individual compute nodes in a SIMD partition (130) booted in MIMD mode.

In the example of FIG. 6, the SIMD machine supports partitioning, and each partition can be booted either in SIMD mode or in MIMD mode. When a SIMD partition (132) is booted in SIMD mode, the entire partition is booted in SIMD mode, and instances of one SIMD program at a time will be run on all the compute nodes of the partition. When a SIMD partition (130) is booted in MIMD mode, the entire partition is booted in MIMD mode, and multiple MIMD programs can then be run on any or all of the compute nodes of the partition. A control application (124) according to embodiments of the present invention can establish on a SIMD machine a SIMD partition booted in MIMD mode, with a SIMD partition booted in SIMD mode running simultaneously with the SIMD partition booted in MIMD mode. On such a SIMD machine, multiple MIMD applications may be run simultaneously in one partition while SIMD applications are run in another partition, all on the same machine at the same time.

In the example of FIG. 1, all the compute nodes (102) are initially configured exclusively for SIMD operations, and the system of FIG. 1 operates generally to execute MIMD programs (158, 161) on a SIMD machine (100) according to embodiments of the present invention by establishing on the SIMD machine a plurality of SIMD partitions (130, 132); booting a first SIMD partition (130) in MIMD mode; executing, on a compute node (102) of the first SIMD partition (130) booted in MIMD mode, a MIMD accelerator program (161); executing a SIMD program (151) in a second SIMD partition (132), one instance (153, 155, 157, 159) of the SIMD program (151) executing on each compute node (102) of the second SIMD partition (132), each instance of the SIMD program carrying out a portion of the data processing effected by the SIMD program; and accelerating, by an instance of the SIMD program through the MIMD accelerator program, a portion of the data processing of the instance of the SIMD program.

Figure 7:
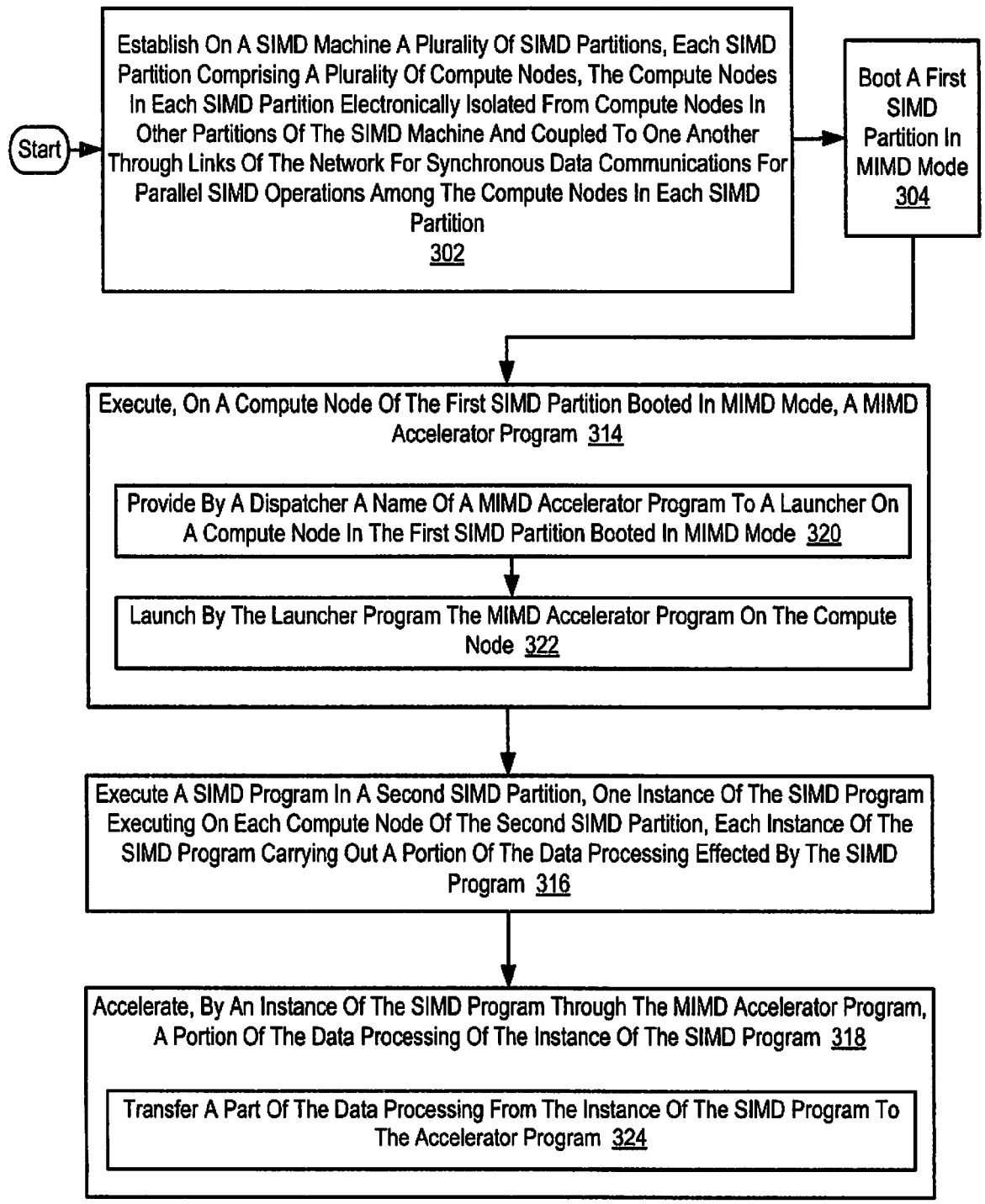
FIG. 7 sets forth a flow chart illustrating an exemplary method of executing MIMD programs on a SIMD machine according to embodiments of the present invention.

For further explanation, FIG. 7 sets forth a flow chart illustrating an exemplary method for executing MIMD programs on a SIMD machine according to embodiments of the present invention. The method of FIG. 7 is carried out on a SIMD machine similar to the SIMD machines described above (100 on FIG. 1). That is, the method of FIG. 7 is carried out on a SIMD machine that includes a number of compute nodes, where each compute node is capable of executing only a single thread of execution, and the compute nodes are initially configured exclusively for SIMD operations. The SIMD machine includes at least one data communications network (106, 108 on FIG. 1) that includes synchronous data communications links among the compute nodes.

The method of FIG. 7 includes establishing (302) a plurality of SIMD partitions (130, 132 on FIG. 1), where each SIMD partition includes a plurality of compute nodes (102 on FIG. 1). The compute nodes in each SIMD partition are electronically isolated from compute nodes in other partitions of the SIMD machine. The compute nodes in each SIMD partition are coupled to one another through links of a network (106 or 108 on FIG. 1) for synchronous data communications for parallel SIMD operations among the compute nodes in each SIMD partition.

The method of FIG. 7 also includes booting (304) a first SIMD partition in MIMD mode (130 on FIG. 1). Booting SIMD partitions in MIMD mode is explained in more detail below with reference to FIG. 8.

The method of FIG. 7 also includes executing (314), on a compute node of the first SIMD partition booted in MIMD mode, a MIMD accelerator program. In the method of FIG. 7, executing (314) a MIMD accelerator program is carried out by providing (320) by a dispatcher a name of a MIMD accelerator program to a launcher on a compute node in the first SIMD partition booted in MIMD mode and launching (322) by the launcher program the MIMD accelerator program on the compute node. The launcher program typically launches the MIMD accelerator program by use of a Unix-like exec( ) function that wipes the launcher program from process memory, overlaying it with the MIMD accelerator program.

The method of FIG. 7 also includes executing (316) a SIMD program in a second SIMD partition, one instance of the SIMD program executing on each compute node of the second SIMD partition. Each instance of the SIMD program carries out a portion of the data processing effected overall by the SIMD program.

The method of FIG. 7 also includes accelerating (318), by an instance of the SIMD program through the MIMD accelerator program, a portion of the data processing of the instance of the SIMD program. In the method of FIG. 7, accelerating (318) a portion of the data processing of the instance of the SIMD program is carried out by transferring (324) a part of the data processing from the instance of the SIMD program to the accelerator program. The portion of data processing is transferred by use of a data communications network such as one of the networks described above with regard to references 104, 106, 108, 109, and 174 on FIG. 1. The portion of data processing so transferred may be data only, where all the executable code for acceleration is already a component of the accelerator program, or, alternatively, the portion of data processing so transferred may include both data whose processing is to be accelerated as well as executable code.

Figure 8:
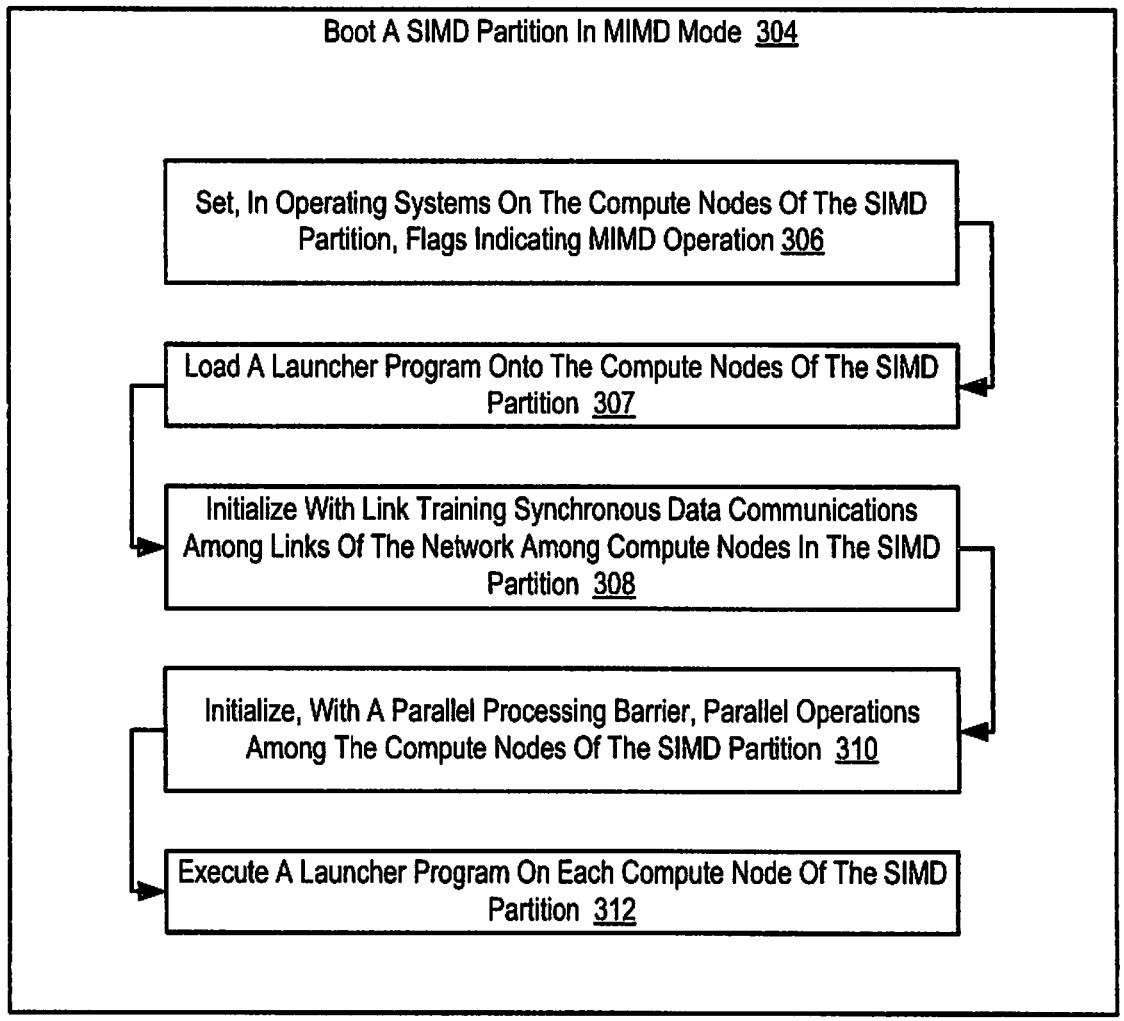
FIG. 8 sets forth a flow chart illustrating an exemplary method of booting a SIMD partition in MIMD mode according to embodiments of the present invention.

FIG. 8 sets forth a flow chart illustrating an exemplary method of booting (304) a SIMD partition (130 on FIG. 1) in MIMD mode according to embodiments of the present invention. In the example of FIG. 8, booting (304) a SIMD partition in MIMD mode includes setting (306), in operating systems on the compute nodes of the SIMD partition, flags indicating MIMD operation. Such flags are Boolean data elements, and setting them means setting them to TRUE. Booting (304) a SIMD partition in MIMD mode also includes loading (307) onto the compute nodes of the SIMD partition a launcher program (135 on FIG. 1), one instance of the launcher program on each compute node in the SIMD partition booted in MIMD mode.

In this example, booting (304) a SIMD partition in MIMD mode also includes initializing (308) with link training synchronous data communications among links of the network among compute nodes in the SIMD partition. Link training is an initialization process for links in a high performance network that uses specific data packet types known as training sequences to enable each link to determine its link width, polarity, device presence, and also to detect problems in the link.

Booting (304) the SIMD partition in MIMD mode in this example also includes initializing (310), with a parallel processing barrier, parallel operations among the compute nodes of the SIMD partition. A parallel processing barrier is a parallel processing function, typically implemented as a member of a message passing library such as MPI, that synchronizes operation of all processes executing in a SIMD partition. All processes in the partition contain a call to a barrier at a point in processing where all the processes need to be synchronized. Each process that calls the barrier function waits to continue processing until all of the processes in the partition have called the barrier function. It is not uncommon for high performance SIMD machines to implement barriers with special hardware support, as is the case for the SIMD machine described above with reference to FIG. 1. That SIMD machine has an independent data communication network (109 on FIG. 1) dedicated to the execution of barriers.

Booting (304) the SIMD partition in MIMD mode in the example of FIG. 8 also includes executing (312) a launcher program (135 on FIG. 1) on each compute node in the SIMD partition. A launcher program (135), as described above in more detail, is a module of computer program instructions that runs on a compute node in a SIMD partition booted in MIMD mode, receives from a MIMD dispatcher a name of a MIMD program, and executes the MIMD program on the compute node.

Figure 9:
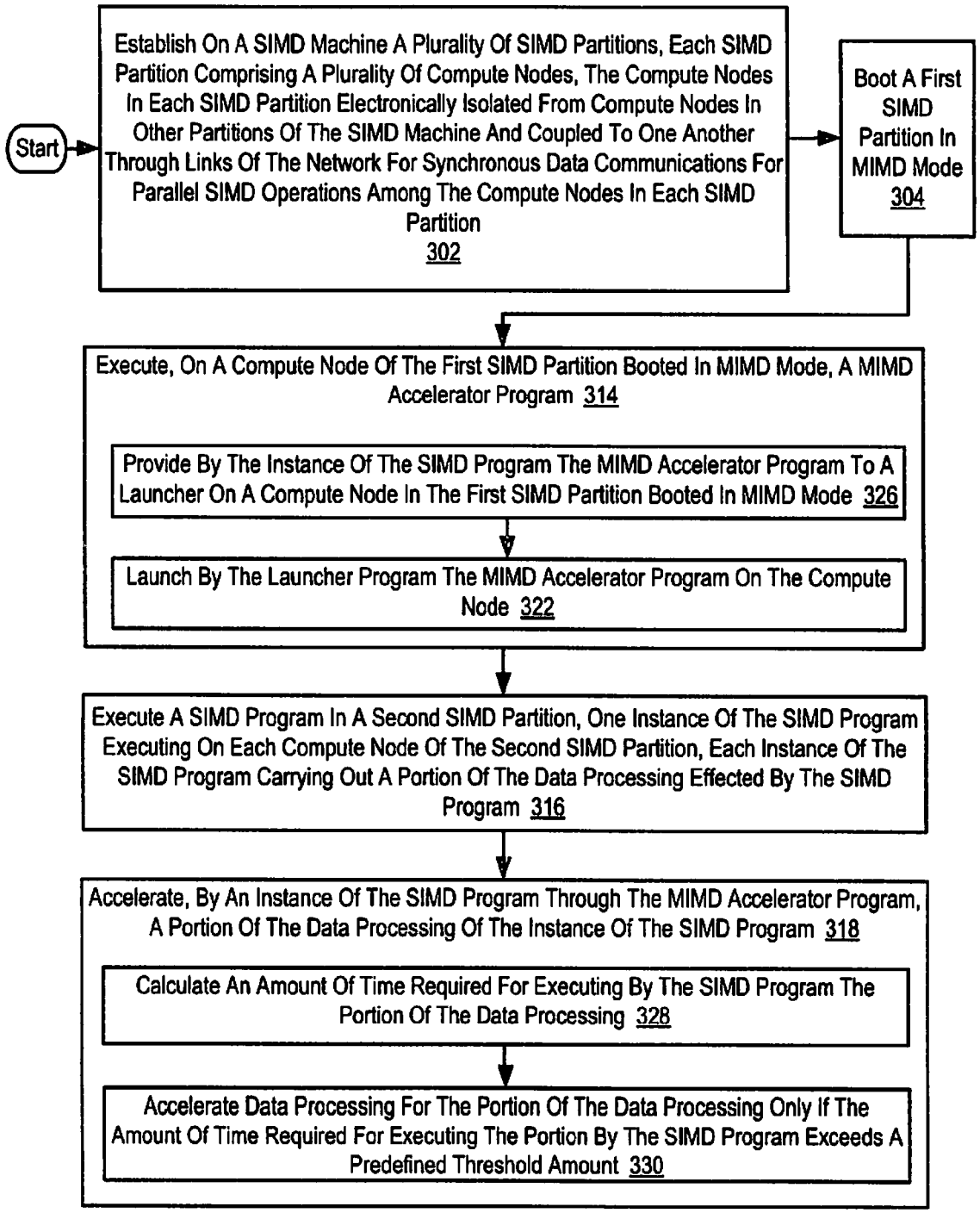
FIG. 9 sets forth a flow chart illustrating a further exemplary method of executing MIMD programs on a SIMD machine according to embodiments of the present invention.

For further explanation, FIG. 9 sets forth a flow chart illustrating a further exemplary method for executing MIMD programs on a SIMD machine according to embodiments of the present invention. The method of FIG. 9 is similar to the method of FIG. 7, carried out on a SIMD machine similar to those described above and including as it does establishing (302) a plurality of SIMD partitions;

booting (304) a first SIMD partition in MIMD mode; executing (314), on a compute node of the first SIMD partition booted in MIMD mode, a MIMD accelerator program; executing (316) a SIMD program in a second SIMD partition; accelerating (318), by an instance of the SIMD program through the MIMD accelerator program, a portion of the data processing of the instance of the SIMD program—all of which—subject to the exceptions described just below in this specification—function in a similar manner as described above with regard to the method of FIG. 7.

In the method of FIG. 9, unlike the method of FIG. 7, executing (314) a MIMD accelerator program is carried out by providing (326) by the instance of the SIMD program the MIMD accelerator program to a launcher on a compute node in the first SIMD partition booted in MIMD mode and launching (322) by the launcher the accelerator program on the compute node. That is, in the method of FIG. 7, it is the instance of the SIMD program rather than the dispatcher that provides the accelerator program to the launcher. The instance of the SIMD program may provide the accelerator program to the launcher literally, as an executable module of computer program instructions, or by name, by providing a name of a MIMD accelerator program for the launcher to load from disk. In this way, the MIMD accelerator program is executed only when it is actually needed rather than being dispatched by a dispatcher to occupy computer resources waiting for a request for acceleration that may never come.

Also in the method of FIG. 9, unlike the method of FIG. 7, accelerating (318) a portion of the data processing of the instance of the SIMD program is carried out by calculating (328) an amount of time required for executing by the SIMD program the portion of the data processing and accelerating (330) data processing for the portion of the data processing only if the amount of time required for executing the portion by the SIMD program exceeds a predefined threshold amount. In sparse matrix multiplication, for example, when the only duty of an instance of a SIMD program is to multiply by zero, it needs no acceleration. When another instance must carry out a complex, floating point multiplication, requiring much more time than multiplying by zero, and a barrier is approaching, acceleration is needed. The benefit of this method is too help all instances of the SIMD partition to execute the barrier as near simultaneously as possible. If even one instance is very late to the barrier, all the other instances of the SIMD program are wasting processing time waiting for the late instance to arrive at the barrier.

Exemplary embodiments of the present invention are described largely in the context of a fully functional computer system for executing MIMD programs on a SIMD machine. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web.

Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing Multiple Instructions Multiple Data ('MIMD') programs on a Single Instruction Multiple Data ('SIMD') machine, the SIMD machine comprising a plurality of compute nodes, each compute node capable of executing only a single thread of execution, the plurality of compute nodes initially configured exclusively for SIMD operations, the SIMD machine further comprising a data communications network, the data communications network comprising synchronous data communications links among the plurality of compute nodes, the method comprising:

establishing on the SIMD machine a plurality of SIMD partitions, each SIMD partition comprising a plurality of the compute nodes, the plurality of compute nodes in each SIMD partition electronically isolated from compute nodes in other partitions of the SIMD machine and coupled to one another through links of the data communications network for synchronous data communications for parallel SIMD operations among the plurality of compute nodes in each SIMD partition;

booting a first SIMD partition in MIMD mode;

executing, on a compute node of the first SIMD partition booted in MIMD mode, a MIMD accelerator program;

executing a SIMD program for effecting a data processing in a second SIMD partition, one instance of the SIMD program executing on each compute node of the second SIMD partition, each instance of the SIMD program carrying out a portion of the data processing effected by the SIMD program; and accelerating, by an instance of the SIMD program through the MIMD accelerator program, a portion of the data processing of the instance of the SIMD program, the accelerating further comprising the steps of:

calculating an amount of time required for executing by the SIMD program the portion of the data processing; and accelerating data processing for the portion of the data processing only if the amount of time required for executing the portion by the SIMD program exceeds a predefined threshold amount.

2. Apparatus for executing Multiple Instructions Multiple Data ('MIMD') programs on a Single Instruction Multiple Data ('SIMD') machine, the SIMD machine comprising a plurality of compute nodes, each compute node capable of executing only a single thread of execution, the plurality of compute nodes initially configured exclusively for SIMD operations, the SIMD machine further comprising a data communications network, the data communications network comprising synchronous data communications links among the plurality of compute nodes, the apparatus comprising a computer processor, a computer memory operatively coupled to the computer processor, the computer memory having disposed within it computer program instructions capable of:

establishing on the SIMD machine a plurality of SIMD partitions, each SIMD partition comprising a plurality of the compute nodes, the plurality of compute nodes in each SIMD partition electronically isolated from compute nodes in other partitions of the SIMD machine and coupled to one another through links of the data communications network for synchronous data communications for parallel SIMD operations among the plurality of compute nodes in each SIMD partition;

booting a first SIMD partition in MIMD mode;

executing, on a compute node of the first SIMD partition booted in MIMD mode, a MIMD accelerator program;

executing a SIMD program for effecting a data processing in a second SIMD partition, one instance of the SIMD program executing on each compute node of the second SIMD partition, each instance of the SIMD program carrying out a portion of the data processing effected by the SIMD program; and accelerating, by an instance of the SIMD program through the MIMD accelerator program, a portion of the data processing of the instance of the SIMD program, the accelerating further comprising:

calculating an amount of time required for executing by the SIMD program the portion of the data processing; and accelerating data processing for the portion of the data processing only if the amount of time required for executing the portion by the SIMD program exceeds a predefined threshold amount.

3. A computer program product for executing Multiple Instructions Multiple Data ('MIMD') programs on a Single Instruction Multiple Data ('SIMD') machine, the SIMD machine comprising a plurality of compute nodes, each compute node capable of executing only a single thread of execution, the plurality of compute nodes initially configured exclusively for SIMD operations, the SIMD machine further comprising a data communications network, the data communications network comprising synchronous data communications links among the plurality of compute nodes, the computer program product disposed in a computer readable recordable medium, the computer program product comprising computer program instructions capable of:

establishing on the SIMD machine a plurality of SIMD partitions, each SIMD partition comprising a plurality of the compute nodes, the plurality of compute nodes in each SIMD partition electronically isolated from compute nodes in other partitions of the SIMD machine and coupled to one another through links of the data communications network for synchronous data communications for parallel SIMD operations among the plurality of compute nodes in each SIMD partition;

booting a first SIMD partition in MIMD mode;

executing, on a compute node of the first SIMD partition booted in MIMD mode, a MIMD accelerator program;

executing a SIMD program for effecting a data processing in a second SIMD partition, one instance of the SIMD program executing on each compute node of the second SIMD partition, each instance of the SIMD program carrying out a portion of the data processing effected by the SIMD program; and accelerating, by an instance of the SIMD program through the MIMD accelerator program, a portion of the data processing of the instance of the SIMD program, the accelerating further comprising the steps of:

calculating an amount of time required for executing by the SIMD program the portion of the data processing; and accelerating data processing for the portion of the data processing only if the amount of time required for executing the portion by the SIMD program exceeds a predefined threshold amount.

* * * * *